Oct. 11, 1960
W. C. SIMPSON
2,956,034
BITUMINOUS COMPOSITIONS
Filed April 25, 1958
2 Sheets-Sheet 1
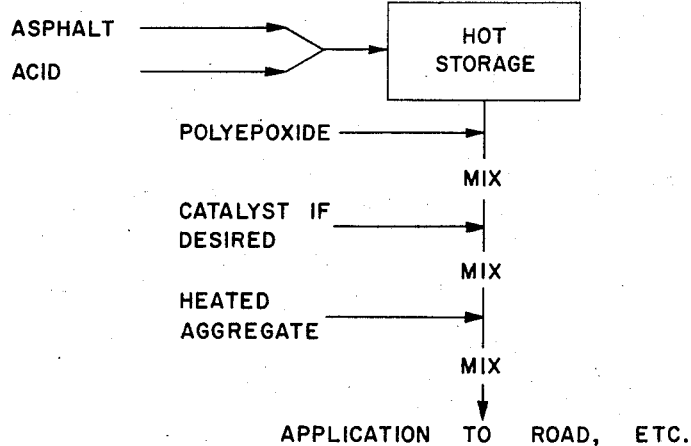
FIG. I
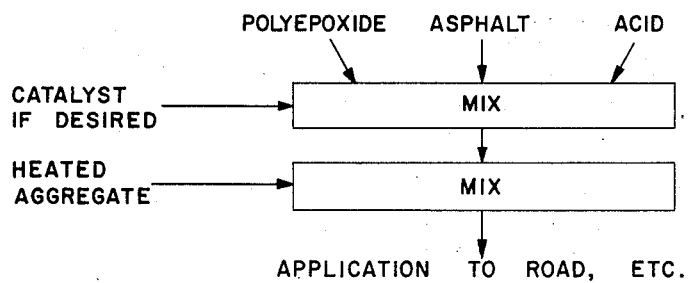
FIG. II
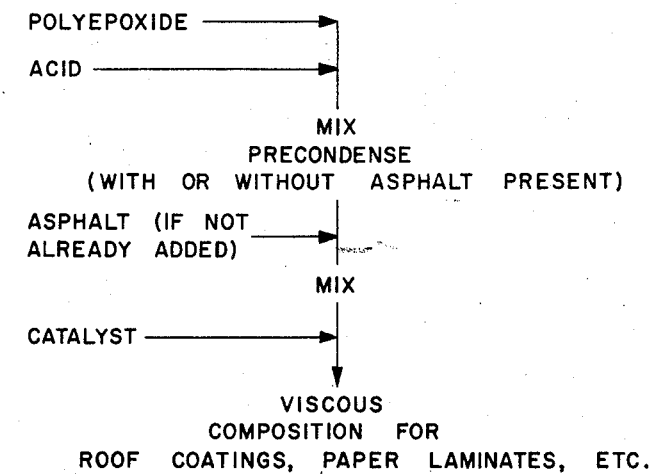
FIG. III
INVENTOR:
WARREN C. SIMPSON
BY:
HIS AGENT

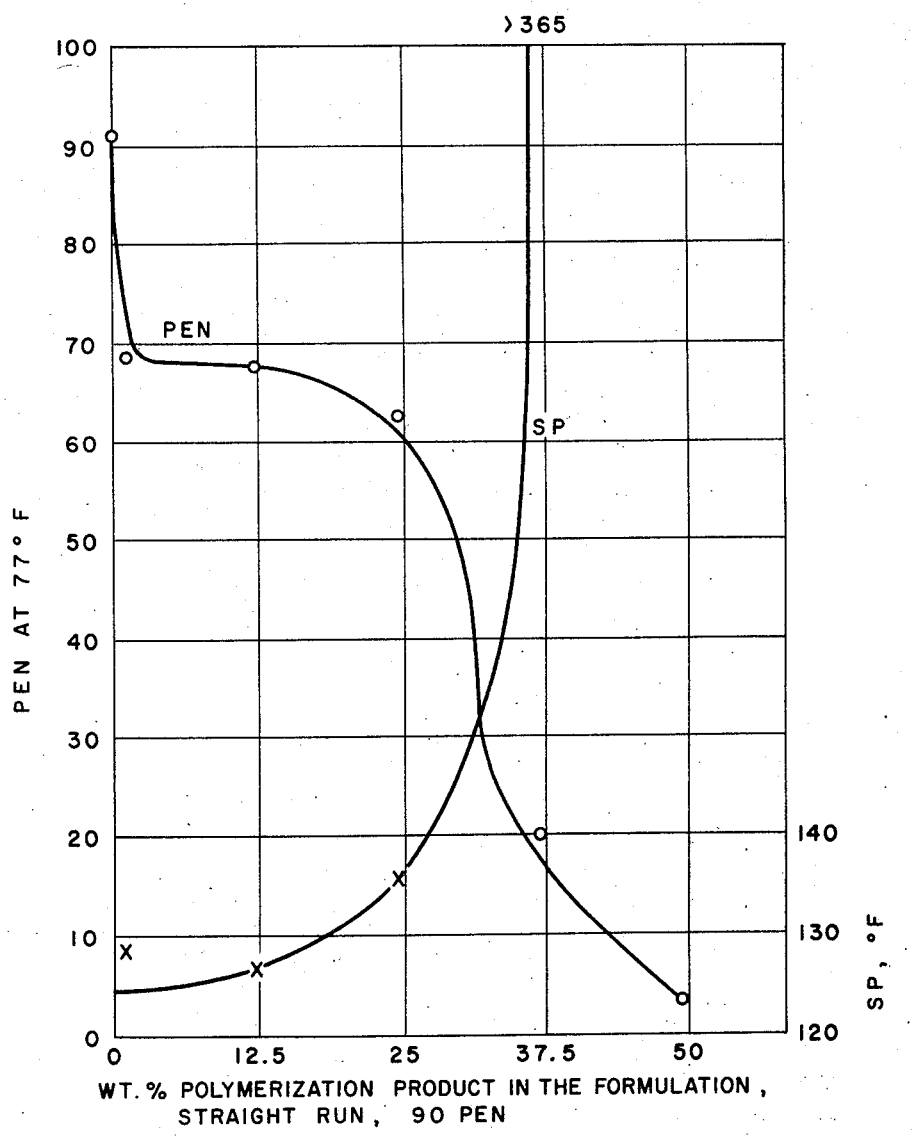
FIG. IV

United States Patent Office 2,956,034
Patented Oct. 11, 1960

2,956,034

BITUMINOUS COMPOSITIONS

Warren C. Simpson, Berkeley, Calif., assignor to Shell Oil Company, a corporation of Delaware Filed Apr. 25, 1958, Ser. No. 730,857

19 Claims. (Cl. 260—18)

This invention relates to new bituminous compositions. More particularly, the invention relates to new bituminous compositions containing special reactive components which are particularly useful for preparing roads and walkways and/or surfacing of already prepared roadways and walkways.

Specifically, the invention provides new and particularly useful compositions comprising (1) a bituminous material, such as, for example, an asphalt, (2) a polyepoxide having more than one vic-epoxy group, and preferably a liquid polyglycidyl ether of a polyhydric phenol, and (3) a polymerized unsaturated long chain acid. The invention further provides cured products obtained preferably by heating the above-described compositions. As a special embodiment, the invention provides a method for utilizing the above-described compositions in the construction of roadways, airfields, walkways and the like. As a further embodiment, the invention provides a method for utilizing the new compositions in the surfacing of already prepared readways, airfields, walkways and the like, particularly to impart skid resistance.

This application is a continuation-in-part of my copending application Serial No. 608,721, filed September 10, 1956.

There is a growing need for better materials for use in construction of roadways, airfields and the like. Such materials, for example, should have better wear resistance, better solvent and heat resistance (as in the case of asphalt roads) and better resistance to skidding. There is also a need for an economical surfacing composition that can be applied to already formed concrete and asphalt road or storage areas to help reduce the destruction of the surface due to wear, rain, deicing salts and cracking due to brittleness in cold weather. In the case of asphalt surfaces, there is also a need for coatings that would improve resistance to heat and solvents. This is particularly urgent in the case of maintenance areas, warm-up pads and asphalt runways for jet aircraft as the heat and jet fuels readily attack asphalt surfaces. Further, concrete and asphalt road surfaces and exposed metal on bridge roadways, etc. tend to develop smooth surfaces due to wear which cause skidding when wet and there is a great need for a non-skid coating that will adhere to these surfaces.

Various compositions have been suggested for the above purposes, but the compositions suggested heretofore have not proved very satisfactory. In most cases, the new compositions fail to have any improved wearability, solvent resistance or skid resistance. When applied as a coating over already prepared concrete and asphalt roadways, they fail to have the necessary adhesion, particularly if the surfaces are the least oily or dirty. In other cases, the coatings fail to stand up under inclement weather conditions. In still other cases, the coatings fail to have the necessary resistance to solvents and heat or fail to have good wear and non-skid properties. In other cases, the coatings are too brittle for use on large areas. In still other cases, the coatings are too expensive or too difficult to apply.

It is an object of the invention, therefore, to provide new compositions which are suitable for use in the construction of new roadways, airfields, walkways and the like. It is a further object to provide new compositions which may be used to prepare roadways which have better wearability, solvent resistance and skid resistance. It is a further object to provide new compositions which are useful as coatings for concrete, asphalt, wood and metal surfaces. It is a further object to provide new compositions which form coatings for concrete, asphalt, wood and metal having excellent resistance to wear, rain and cold weather. It is a further object to provide new surfacing compositions which form films having good resistance to solvents, heat, and deicing salts. It is a further object to provide new surfacing compositions which have good flexibility. It is a further object to provide new surfacing compositions which have good skid resistance. It is a further object to provide new coatings which are relatively inexpensive and can be easily applied to new and old surfaces and surfaces which have large area. Other objects and advantages of the invention will be apparent from the following detailed description thereof.

It has now been discovered that these and other objects may be accomplished by the compositions of the invention comprising (1) a bituminous material, such as, for example, an asphalt, (2) a polyepoxide having more than one vic-epoxy group, and preferably a liquid polyglycidyl ether of a polyhydric phenol, and (3) a polymerized unsaturated long chain acid. It has been unexpectedly found that the above-described compositions are excellent binders for aggregate and in combination therewith form compositions which can be used to form superior roadways, airfields, walkways and the like. The roadways, etc. prepared from these special compositions have excellent wearability, excellent heat resistance and solvent resistance and good skid resistance. In addition, it has been found that the above-described compositions can be used as surfacing compositions for already formed roadways, airfields, walkways and the like, and particularly those prepared from concrete, asphalt, wood, metal and the like. They have excellent adhesion to such surfaces and can be cured in combination therewith to form tough flexible coatings. The resulting surfaces also have surprising resistance to solvents, such as gasoline, jet fuels and the like, and have good heat resistance, i.e., do not soften or run when exposed to high temperatures. In addition, the wear resistance and resistance to weather are outstanding for such coatings.

When small inert particles are added to the compositions before or during cure, the cured coatings have excellent resistance to skidding. The coatings are particularly attractive for use on highways and runways, as they can be easily applied to large areas and set up quickly without the use of any special curing conditions.

These compositions have been found to be useful not only for the treatment of roadways and airfields, but are equally valuable for the treatment of dock area, warehouse floors, sidewalks, tennis courts, ship decks, and the like where wear and weather resistant properties are desired.

It was quite unexpected to find that the new compositions had such superior properties. It had been found heretofore, for example, that certain bituminous materials, such as straight run asphalts, were incompatible with polyepoxides, such as glycidyl polyethers. Further, it was unexpected to find that the coatings were highly flexible and heat resistant as it is known that bituminous materials generally form brittle coatings which soften on heating. The polyepoxides also form relatively brittle coatings in comparison with those of the compositions described.

The bituminous materials used in the compositions of the present invention include substances containing bitumens or pyrobitumens, pyrogeneous distillates and tar, pyrogeneous waxes and pyrogeneous residues (pitches and pyrogeneous asphalts). They are preferably composed mainly of hydrocarbons although they may contain amounts of sulfur, nitrogen and oxygen-containing materials. They also are preferably fusible and largely soluble in carbon disulfide. Examples of such bituminous materials may be found in Abraham's "Asphalts and Allied Substances," vol. I, page 57, 5th edition.

An especially preferred group of bituminous materials to be used in the compositions of the invention include the asphalts. These asphalts may be straight run, blown, cracked and catalytically or noncatalytically polymerized asphalts. All such asphalts are useful regardless of their original penetrations or softening points.

Especially preferred are the straight run asphalts used for paving, such as those having penetrations between 40 and 300 and softening points within the range from about 145° F. to about 95° F. Blown asphalts are normally produced in the presence or absence of catalysts by blowing asphalts or fluxes at elevated temperatures with an oxygen-containing gas such as air. Typical blown asphalt may have softening point range of between about 300° F. and about 120° F. and a penetration within the range from about 100 to about 0.

Aromatic asphalts, such as those comprising the bottoms products from the distillation of catalytically cracked gas oil, are also preferred.

Other preferred materials include high boiling extracts of petroleum, such as those obtained by extracting petroleum with solvents having preferential selectivity for aromatic. To obtain such extracts various non-reactive, highly polar, aromatically preferential solvents are used such as liquid $SO_2$, phenol, cresylic acid, furfural, beta, beta-dichloroethyl ether, nitrobenzene and the like. The use of the so-called double solvent process employing mutually immiscible solvents like cresylic acid and propane also gives suitable extracts. Especially preferred are the Edeleanu and furfural extracts of petroleum distillates, i.e., extracts obtained by use of liquid $SO_2$ or liquid $SO_2$ in combination with benzene, etc. The extracts are high-boiling materials which range in general from viscous liquids to tar-like materials at ordinary temperatures. Extracts boiling above 300° C. at 760 mm. Hg are preferred.

Another preferred group of bituminous materials include residual fuel oils, such as residual fuel oils having a viscosity between 10 cs. at 100° F. to about 1500 cs. at 100° F.

Also preferred are the products derived from coal such as coal tars, refined coal tars and coal tar pitches, and preferably those having a softening point below 190° F. and a solubility in carbon disulfide of at least 50%. The expression "tar" as used herein refers to products obtained in connection with the destructive distillation of coal. When part of the volatile material is removed, the residue is called "refined coal tar." When additional volatile material is removed, the residue is termed "coal tar pitch." Residuals having a fusing point below about 90° F. are referred to herein as refined coal tars while those having fusing points of 90° F. or above are coal tar pitches. As used herein, in reference to coal tar products, "softening point" or "fusing point" refers to values obtained by the cube method as described in vol. II, Abraham, "Asphalts and Allied Substances," 5th edition. The coal products should possess at least 50% and preferably 75% solubility in carbon disulfide. The coal tar, refined coal tar and coal tar pitch may be acidic, basic or neutral, depending on whether the acid and/or bases have been removed. These coal products may be obtained from various types of bituminous coals, such as, for example, cannel, bog-peat, carbonite, and the like, and may be derived from various processes, such as from gas works, coke ovens, blast furnaces, gas producers and various low temperature processes. Description of examples of various coal tars, refined coal tars and coal tar pitches may be found on pages 384 to 405 of Abraham, "Asphalts and Allied Substances."

Particularly preferred coal derivatives to be used in preparing the compositions of the present invention include the residuals resulting from distillation of coal tar, and preferably refined coal tars having a fusing point of below 70° F. and a solubility in carbon disulfide of at least 75% with a specific gravity of 1.10 and 1.50, and low melting coal tar pitches having a fusing point below 120° F. and a solubility in carbon disulfide of at least 75%.

The polyepoxides to be used in preparing the compositions of the invention comprise those materials possessing more than one vicinal epoxy group, i.e., more than one

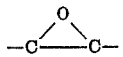

group. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated caster oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflow, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3-epoxyoctyl) tetrahydrophthalate, di(4,5-epoxydodecyl) maleate, di(2,3-epoxybutyl) terephthalate, di(2,3-epoxypentyl) thiodipropionate, di(5,6-epoxytetradecyl) diphenyldicarboxylate, di(3,4-epoxyheptyl) sulfonyldibutyrate, tri(2,3-epoxybutyl) 1,2-4-butanetricarboxylate, di(5,6-epoxypentadecyl) tartarate, di(4,5-epoxytetradecyl) maleate, di(2,3-epoxybutyl) azelate, di(3,4-epoxybutyl) citrate, di(5,6-epoxyoctyl) cyclohexane-1,3-dicarboxylate, di(4,5-epoxyoctadecyl) malonate.

Another group of the epoxy-containing materials include those epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-epoxycyclohexanoate, 3,4-epoxycyclohexyl 4,5 - epoxyoctanoate, 2,3 - epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13-diepoxyeicosanedioate, dibutyl 7,8-

11,12 - diepoxyoctadecanedioate, dioctyl 10,11 - diethyl-8,9,12,13-diepoxy-eicosanedioate, dihexyl 6,7,10,11-diepoxyhexadecanedioate, didecyl 9 - epoxy - ethyl - 10,11-epoxyoctadecenedioate, dibutyl 3-butyl-3,4,5,6-diepoxy-cyclohexane-1,2-dicarboxylate, dicyclohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprise the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene gylcol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in above-noted U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g. and melting point 85° C.) polyglycidyl ether of 1,1,5,5-tetrakis(hydroxyphenyl) pentane (epoxy value 0.514 eq./100 g.) and the like and mixtures thereof.

The polymerized unsaturated long chain acids used in the compositions of the present invention are those obtained by polymerizing unsaturated long chain acids under known conditions, such as heat, peroxides and the like. Examples of long chain acids that may be used for this purpose include those containing at least 10 carbon atoms, and preferably more than 14 carbon atoms, such as, for example, dodecenedioic acid, 10,12-eicosadienedioic acid, tetradecenoic acid, linoleic acid, linolenic acid, eleostearic acid and licannic acid.

Normally, the polymerization is effected by utilizing the lower aliphatic esters of the unsaturated acids so as to prevent decarboxylation during the heating period, and then removing the ester groups through hydrolysis. This process is illustrated in the Industrial and Engineering Chemistry article, page 1139, vol. 38 (1946). The structure of some of the polymerized acids are shown in Industrial and Engineering Chemistry, vol 33, page 89 (1941).

Particularly preferred are the trimerized acids obtained from the ethylenically unsaturated fatty acids as derived from semi-drying and drying oils, and particularly, the conjugated fatty acids containing from 12 to 20 carbon atoms. The generic structure of the resulting trimerized acids is believed to be that of the following:

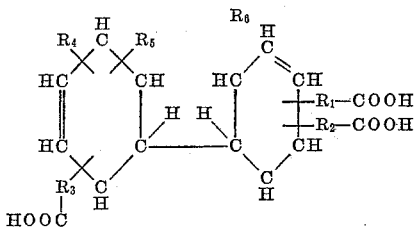

In the above formula, $R_1$, $R_2$ and $R_3$ constitute alkylene radicals having between 4 and 10 carbon atoms each, while $R_4$, $R_5$ and $R_6$ are alkyl radicals having between 4 and 10 carbon atoms each. Normally, the products will have the generic formula as follows:

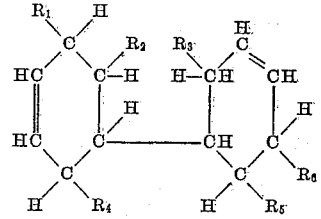

The compositions of the invention may be prepared by a variety of different methods. When the compositions are to be utilized as surfacing compositions which may be cured at elevated temperatures, it is generally preferred to mix the hot bituminous material with the polymerized acids and then combine this hot mixture with the polyepoxide and catalyst (if desired) just before application. If the compositions are to be used in combination with aggregate, hot aggregate may then be added before application. This type of operation is illustrated in schematic form in Figure I.

It is also possible to combine all three ingredients together at the same time, preferably in a heated condition, mixing (with catalyst and aggregate as desired) and then shortly applying the mixture to the desired surface. This type of operation appears to be desirable for coatings of large highway or airfield areas. The operation is illustrated in Figure II.

It is possible to combine the three ingredients together without the use of heat, but this makes mixing and handling sometimes difficult.

If the compositions of the invention are to be used for certain applications, such as in the laminating of paper, or in applications where a high initial viscosity is desired and in which the cure is to be completed at lower temperatures such as near room temperature, it is highly desirable in the mixing to first combine the polymerized acid and polyepoxide together while hot for a certain period as noted hereinafter to effect a type of precondensation and then add the bituminous material and other desired additives, such as, for example, aggregate and the like. Some or all of the bituminous material may also be present during this precondensing period. This type of operation is illustrated in schematic form in Figure III.

The proportions of the three components to be utilized in the above methods of preparation may vary within certain limits. The polyepoxide and the polymerized acid are preferably combined in approximately chemical equivalent amounts, i.e., an amount sufficient to furnish one epoxy group for every carboxyl group. Up to about 30% excess of either reactant may be employed, however, and still obtain the desired results.

The amount of the reactive components, i.e., the polyepoxide and the polymerized acids, to be employed in relation to the amount of the bituminous material will preferably vary from about 0.5% to about 85% by weight, the proportion being governed by the intended use of the final product. For example, if a substantially infusible composition is desired, the proportion of the polyepoxide and acid should be in excess of about 15%, and preferably 20% to 50%. If, on the other hand, it is desired only to increase the softening point moderately or to decrease the penetration of an asphalt to a limited extent, the presence of from 0.5% to 10% by weight of the polyepoxide and acid, shows a striking response with respect to both properties. The normal amounts of these components to be used in relation to the bituminous material will vary from about 20% to about 65%.

Figure IV represents a typical application of the present invention indicating the effect of varying the amount of the polyepoxide and acid on the penetration and softening point of an asphalt product.

As noted, it is preferred to employ heat during the mixing of the components. Preferred temperatures range from about 200° F. to about 400° F., and more preferably from about 250° F. to 350° F. The heat may be applied by first preheating one or more of the ingredients, such as the asphalt and polymerized acid, or by heating the mixture of the two or three components together.

In the case where precondensation of the polyepoxide and polymerized acid is desired, the heating of the mixture should be extended to effect the necessary precondensation. The exact time selected will depend, in large part, upon the temperature employed and upon the degree of polymerization of the acid. Precondensation temperatures should normally range between about 50 and 250° C. and the time of precondensation within this temperature range will usually be between about 5 minutes and about 120 minutes. Normally, when the precondensation temperature is within the range from about 75 to 150° C. the time of precondensation will be between about 15 and 60 minutes when the acids are trimerized, and will be between about 3 and 10 hours when the acids are dimerized, with intermediate ranges of time useful when employing mixtures of dimer with trimers.

An especially preferred type of composition covered by the present invention include those wherein aggregate, sand, etc. are added before, during or after the preparation of the compositions. If the compositions are to be used as binders for aggregate in construction of new roadways, airfields and walkways, as noted hereinbefore, the aggregate (e.g., crushed rock, quartz, shells, aluminum oxide particles, etc.) may be added as illustrated in Figures I, II and III. If the compositions are to be used as surfacing compositions to form skid resistant coatings, the aggregate may also be added before, after or during the preparing. In this case, the aggregate, sand, etc. is preferably added after the coating has been spread. It is also desirable, in some cases, to add a part of the particles during the preparation, and then spread addition particles on the coating after it has been applied to the surface. In the case of coating highways and walkways, it is generally preferred to apply the inert particles after the composition has been spread on the road or walkway. Excess particles may be removed after cure has taken place.

The inert particles or aggregate should preferably be rather finely divided and preferably have a mesh size varying from about 4 to 300. Preferred materials include sand, crushed rocks, finely divided shells, crushed quartz, aluminum oxide, finely divided resinous particles, and the like. Particularly preferred are the minerals, and especially the siliceous materials, such as, for example, sand and ground rock. Mixtures of various types of particles may also be used.

When used to prepare roadways etc., it is generally preferred to add the hot aggregate as shown in Figures I, II and III and then mix the components together in a cement or other type of mixer and then apply this mixture to the prepared roadway bed. Roadways prepared in this manner containing large rocks are useful as warning or "rumble" strips for highways.

The compositions of the invention may be cured to form the desired product by application of heat. Temperatures used in such cure generally range from about 100° C. to about 250° C. This heat may be applied by the addition of the above components in a preheated condition, by adding of heated mineral aggregate to the mixture of components or by spreading of heated inert particles or aggregate on the compositions after being spread. The heat may also be applied externally by means of electrical or other types of heaters, infrared lamps, etc.

It was found that the asphalts contain basic nitrogen compounds which act to accelerate the cure of the polyepoxide. With the other bituminous materials, it is desirable to add a curing agent to accelerate cure. The curing agents are particularly desirable if the good curing rates are desired at the lower temperatures.

A great variety of substances are now known to be hardening agents for the resin-forming ingredients of the composition such as alkalies like sodium or potassium hydroxide; alkali phenoxides like sodium phenoxides; carboxylic acids or anhydrides such as oxalic acid or phthalic anhydride; Friedel-Crafts metal halides like aluminum chloride, zinc chloride, ferric chloride, or boron trifluoride, as well as complexes thereof with ethers, acid anhydrides, ketones, diazonium salts, etc.; phosphoric acid and particle esters thereof including n-butyl ortho-phosphate, diethyl ortho-phosphate and hexaethyl tetraphosphate; and amino compounds such as triethylamine, ethylene diamine, diethylamine, diethylene triamine, triethylene tetramine, pyridine, piperidine, N,N'-diethyl-1,3-propanediamine, dicyandiamide, melamine, fatty acid salts of amines, and the like. The curing agent is added and mixed in with the composition after its preparation as noted above. The amounts vary considerably depending upon the particular agent employed. For the alkalies or phenoxides, 1% to 4% is generally suitable. With phosphoric acid and esters thereof, good results are obtained with 1 to 10% added. The amino compounds are preferably used in amounts of about 5 to 15% and the others involve addition of about 1 to 45%.

The compositions of the invention may be utilized for a great variety of different applications. As noted, they can be used as binders in the construction of roads. In this case, the mixtures such as, for example, 1" to 6" thick. Conventional paving equipment may be used in this application.

They are also particularly suited for use as surfacing compositions for various materials, such as concrete, asphalt, wood and steel. The concrete may be of any of the usual types, such as may be prepared from hydraulic cements, such as Portland cement and other types of aluminous and oxy salt type cements. The asphalt surfaces may be those prepared from straight run asphalts or further refined or modified asphalts. The compositions may be applied in very thin coatings or in very thick coatings. The application to the surface may be accomplished in any suitable manner. If material is thick or contains large amount of inert particles, the material may best be applied by use of screed, trowel shovel or broom. If it is of a more fluid nature, it may be generally applied by brushing or spraying. The coatings will generally vary in thickness from about 1/16 inch to about 1/4 inch.

The compositions are also useful as coatings for pipes, off-shore drilling rigs and the like.

The compositions may also be used to make pottings and castings, gasket sealing compositions, roofing compositions and in lamination of paper and the like.

The following examples illustrate the present invention. Unless otherwise specified, parts disclosed in the examples are parts by weight. Polyether resins described in the examples by letters are those described in U.S. 2,633,458. The concrete used in the example was prepared from hydraulic cement (Portland cement), aggregate, sand and water.

*Example I*

This example illustrates the preparation of a composition from Polyether A, trimerized 9,11-octadecadienoic acid and bottoms obtained from the distillation of a catalytically cracked gas oil, using the precondensation method.

61.2 parts by weight of trimerized 9,11-octadecadienoic acid and 38.6 parts by weight of Polyether A were heated together at 100° C. for about 30 minutes, after which the precondensed product was combined with an equal weight of bottoms obtained from distillation of a catalytically cracked gas oil (zero penetration at 77° F. and softening point of 162° F.). To this mixture was added 0.77 part (by weight basis precondensed product) of alpha-methylbenzyldimethylamine. This composition was heated for one hour at 100° C. and gave a cured composition which was exceedingly flexible and tough. It was infusible on a hot plate, not melting at temperatures up to at least 700° F.

When this product is steeped in kerosene at room temperature for one day, it lost only .35% by weight. However, the unmodified catalytically cracked gas oil bottoms when steeped in kerosene at room temperature for one day lost 3.7% by weight.

*Example II*

This example illustrates the preparation of a composition similar to that in Example I using straight run paving grade asphalt.

A Polyether A-trimerized 9,11-octadecadienoic acid precondensate was prepared as in Example I.

39 parts by weight of the precondensed product were mixed with 61 parts by weight of the straight run asphalt, 2.6 parts by weight, based on the Polyether A of the curing agent being utilized, the composition was then mixed, preheated (300° F.) mineral aggregate (90 parts by weight of aggregate and 10 parts of the binder composition). This mixture was spread and compacted with a roller to form a bed 4 inches thick. The bed cured to form a tough flexible roadway having good resistance to solvents and heat.

The binder composition prepared above was also spread on an asphalt pavement as a coating 1/16" thick and allowed to set hard. The resulting coating was sprayed twice each day with jet fuel, using 10 cc. per square foot. The sprayed pavement was then subjected to truck and automobile traffic. No change was noted in the condition of the pavement even after 6 weeks. During a similar period of use and treatment, the unmodified straight run asphalt applied to an asphalt pavement softens and commences to disintegrate during the same period.

Metallic panels were also coated with the above-described binder composition and allowed to set hard. The coatings were substantially undamaged in a standard rain and sunshine weatherometer test after more than 200 cycles, while a coating from unmodified straight run asphalt showed clear signs of disintegration or deterioration after 2 cycles under the same conditions.

*Example III*

The effect of the polymerization product upon the penetration and softening point of a straight run asphalt is demonstrated by Figure I. The same straight run asphalt, having a 90 penetration and a softening point of 120° F. was modified with from 1 to 50% by weight of the precondensed product described in Example I, after which the composition was cured in the presence of the curing agent for 30 minutes at 100° C. The penetration and softening point of the resulting compositions are given in Figure I and show that there is rapid hardening of the asphalt composition, particularly when it contained at least about 10% by weight of the polyether. Likewise, the penetration of the composition rapidly increased to give an infusible product when at least 12.5% by weight of the polyether was present in the formation.

*Example IV*

This example illustrates the preparation of a composition from Polyether A, trimerized linoleic acid and straight run asphalt wherein the components are mixed without first heating to form the precondensate.

62.5% by weight of straight run paving grade asphalt was heated to 300° F. and then mixed with 22.5% trimerized linoleic acid. This mixture was then combined at about 250° F. with 15% Polyether A and 2.6 parts of alpha-methylbenzyldimethylamine added. The mixture was then spread on concrete and allowed to cure while cooling. In about 60 minutes, the mixture had up to a tough flexible coating.

In a related experiment, 95% by weight of sand was mixed with 5% by weight of the above-noted bind and the mixture spread on concrete highway, compacted with rollers and allowed to cure while cooling from 250° F. The resulting coating was tough and solvent resistant and had good resistance to skidding.

*Example V*

This example illustrates the preparation of a composition from Polyether A, 8,12-eicosadienedioic-1,20 acid dimerized and straight run asphalt.

62% by weight of straight run paving grade asphalt was heated to 300° F. and then mixed with 23% dimerized 8,12-eicosadienedioic acid-1,20. This mixture was then combined with 15% by weight of Polyether A and the mixture allowed to set hard at 250° F. The resulting product is a tough and very flexible casting.

In a related experiment, 100% by weight of sand on concrete highway and allowed to cure while cooling from 250° F. to ambient temperature. The resulting coating was hard and flexible and had good resistance to solvents and good skid resistance.

Related results are obtained by replacing the above polymerized acid with each of the following: 8,12-tetradecodienedioic acid and 8,10-octadecodienedioic acid.

*Example VI*

This example illustrates the preparation of a composition from Polyether A, trimerized linoleic acid and refined coal tar.

65% by weight of refined coal tar was heated to 240° F. and then mixed with 21% trimerized linoleic acid. This mixture was then combined with 15% by weight of Polyether A and 2.6 parts of alphamethylbenzyldimethylamine and the mixture allowed to set hard while cooling from 250° F. The resulting product was a tough flexible coating.

In a related experiment, the composition was spread on concrete and asphalt strips and sand spread on the top before cure. The resulting coatings are hard tough skid resistant coatings.

*Example VII*

This example illustrates the preparation of a composition from Polyether A, trimerized linoleic acid and an extract of petroleum distillate (Dutrex 20) having the following properties: Gravity, °API 5.8; flash, Coc. 415° F.; viscosity, SSU at 210° F. 9611; aniline point, 81° F.; acid No. 0.05; and iodine number 69.

62.5% by weight of the extract was heated to 150° C. and then mixed with 22.5% by weight of the trimerized linoleic acid. This mixture was then combined with 15% by weight of Polyether A and the mixture allowed to set at 100° C. The resulting product is a flexible, rubbery, tough solvent resistant coating.

In a related experiment, the composition was spread on concrete and asphalt strips and sand spread on the top before cure. The resulting coatings are flexible, tough and skid resistant.

*Example VIII*

Example VII is repeated with the exception that the extract employed was another extract of petroleum distillate (Dutrex 22) having the following properties: Gravity, °API 3.3; flash, Coc. 525° F.; viscosity, SSF at 210° F., 261; and aniline point, 85° F.

Example IX

The above example is repeated with the exception that the petroleum extract was replaced by each of the following:

(1) Thermally cracked residue having a softening point of 150° F., precipitation index of 71.5 and a penetration at 77° F. of 8.

(2) Petroleum residue comprising an oil-gas pitch having a softening point of 330° F., a precipitation index of 91 and penetration at 77° F. of 0.

(3) A high boiling fraction of coking cycle stock (coking a Mid-Continent vacuum flasher bottoms) having a viscosity SSU at 77° F. of 5000 and initial boiling point of 658° F., molecular weight about 250.

Example X

This example illustrates the preparation of a composition from Polyether A, coal tar pitch having a melting point of 77° F., a specific gravity of 1.25 (25°/25° C.) and solubility in carbon disulfide of 86.5%, and trimerized linoleic acid.

60% by weight of the coal tar pitch was heated to 300° F. and then mixed with 23% trimerized linoleic acid. This mixture was then combined at about 250° F. with 17% Polyether A and 2.6 parts of diethylene triamine. This mixture was then combined with aggregate at 250° F. (90 parts of aggregate to 10 of binder), and the mixture spread and rolled on rock bed to form a roadway of about 6 inches thick. The resulting road was tough and flexible and had good resistance to heat and solvents.

In another experiment, the above-noted binder was spread on concrete sections and sand sprinkled on the top before cure. The resulting coating of about ¼ inch thickness had good solvent resistance and good skid resistance.

Example XI

This example illustrates the preparation of a composition from Polyether A, an industrial residual fuel oil and trimerized linoleic acid.

50% by weight of residual fuel oil having the following properties: Gravity, °API 8.0; flash, PMCC °F. 180; pour point, °F. +35; viscosity, centistokes 370; sulfur, percent w. 1.84; carbon residue, percent w. 19.0, mixed with 30% by weight of trimerized linoleic acid and 20% by weight of Polyether A. The components were mixed and heated to 250° F. This mixture was combined with crushed rock heated to 250° F. (85 parts aggregate to 15 parts binder) and the mixture spread and rolled on rock bed to form a roadway of about 5 inches thickness. The roadway after cure was flexible and rubbery and had good heat and solvent resistance.

In another experiment, the above-noted binder was spread on asphalt sections and sand sprinkled on the top before cure. The resulting coating of about ¼ inch thickness had good solvent resistance and good skid resistance.

Example XII

Example XI was repeated with the exception that the industrial fuel oil was replaced by a light fuel oil having the following properties: Gravity, °API 17.0; flash, PMCC °F. 176; pour point °F. −10; viscosity, centistokes 52; sulfur, percent w. 1.64; carbon residue, percent w. 9.0. Related results are obtained.

I claim as my invention:

1. A composition comprising (1) a polyepoxide having more than one vic-epoxy group, (2) a polymerized unsaturated long chain acid, and (3) a bituminous material.

2. A composition as in claim 1 wherein the polyepoxide is a glycidyl ether of a polyhydric phenol having a molecular weight between 200 and 900.

3. A composition as in claim 1 wherein the polymerized unsaturated long chain is a polymerized drying oil fatty acid.

4. A composition as in claim 1 wherein the bituminous material is an asphalt.

5. A composition as in claim 1 wherein the bituminous material is a coal tar derivative.

6. A composition as in claim 1 wherein the bituminous material is a residual fuel oil.

7. A composition as in claim 1 wherein the bituminous material is an Edeleanu extract of petroleum distillate.

8. A composition as in claim 1 wherein the polyepoxide is a glycidyl polyether of 2,2-bis(4-hydroxyphenyl)propane.

9. A composition comprising (1) a liquid polyepoxide having more than one vic-epoxy group, (2) a polymerized drying oil fatty acid, (3) a petroleum derived bituminous material, and (4) more than 50% by weight of (1), (2), and (3) of inert particles.

10. A composition as in claim 9 wherein the bituminous material is asphalt.

11. A composition as in claim 9 wherein polymerized unsaturated fatty acid is dimerized soybean oil fatty acid.

12. A composition as in claim 9 wherein the polymerized fatty acid is trimerized fatty acid.

13. A composition as in claim 9 wherein the amount of the liquid polyepoxide having more than one vic-epoxy group comprises from 10% to 75% by weight of the mixture of the said polyepoxide and the bituminous material and the bituminous material makes up from 25% to 90% by weight of said mixture and the mixture containing an epoxy curing agent selected from the group consisting of amines, carboxylic acid anhydrides, and boron trifluoride complexes makes up from 1% to 30% by weight of the polyepoxide.

14. A process for preparing a bituminous material comprising mixing a polyepoxide having more than one vic-epoxy group, a polymerized unsaturated long chain acid and a bituminous material together and then heating.

15. A process for preparing a bituminous material which comprises heating and reacting a polyepoxide having more than one vic-epoxy group with a polymerized unsaturated long chain acid for a period of time between 10 and 30 minutes at 100° C. to 170° C., and combining the resulting product with a bituminous material agent.

16. A process for preparing a non-skid coating which comprises applying to the surface to be coated a composition comprising a polyepoxide having more than one vic-epoxy group, a polymerized unsaturated long chain acid, and a petroleum derived bituminous material, and an epoxy curing agent selected from the group consisting of amines, carboxylic acid anhydrides, and boron trifluoride complexes, spreading finely divided inert particles over the coating and then allowing the coating to cure.

17. A process for preparing a composition useful in preparation of roadways and walkways which comprises mixing a polyepoxide having more than one vic-epoxy group with a polymerized unsaturated long chain acid and a petroleum derived bituminous material and then adding an epoxy curing agent selected from the group consisting of amines, carboxylic acid anhydrides, and boron trifluoride complexes and aggregate heated to a temperature of 100° C. to 250° C.

18. A process for preparing an improved roadway or walkway which comprises mixing asphalt and a polymerized unsaturated long chain acid, adding a polyepoxide having more than one vic-epoxy group to this mixture, then adding aggregate heated to a temperature of 100° C. to 250° C., mixing the components, spreading the composition to the desired thickness, compacting and allowing to set.

19. A process for preparing a composition useful in preparing roadways and walkways which comprises mixing a glycidyl polyether of a polyhydric phenol with a polymerized polyethylenically unsaturated fatty acid and an asphalt, and then adding an epoxy curing agent selected from the group consisting of amines, carboxylic acid anhydrides, and boron trifluoride compleses and aggregate heated to a temperature of 100° C. to 250° C.

References Cited in the file of this patent

UNITED STATES PATENTS

| | | |
|---|---|---|
| 2,324,483 | Castan | July 20, 1943 |
| 2,528,417 | Bradley | Oct. 31, 1950 |
| 2,765,288 | Whittier et al. | Oct. 2, 1956 |

FOREIGN PATENTS

| | | |
|---|---|---|
| 758,146 | Great Britain | Oct. 3, 1956 |

OTHER REFERENCES

Charlton: Modern Plastics, September 1954, pages 155–157, 160–161, and 240–243.